G. F. Case.
Rock Drill.
Nº 101095                     Patented Mar. 22, 1870.
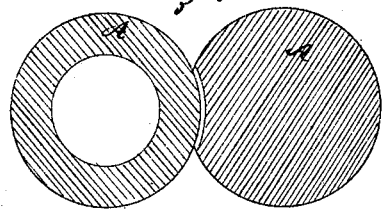
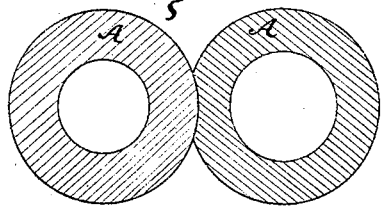
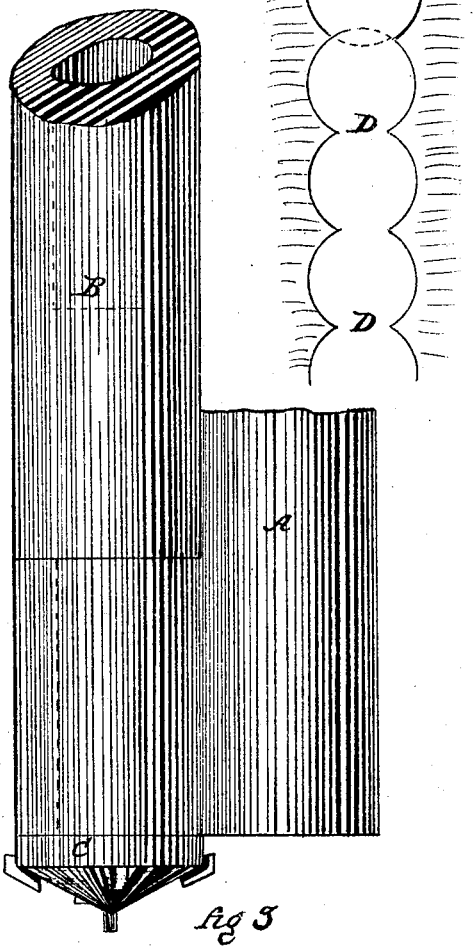
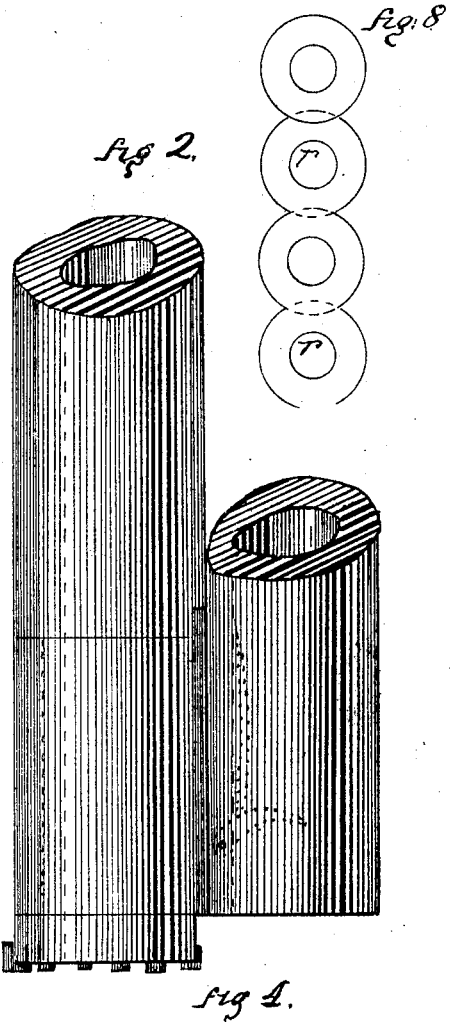
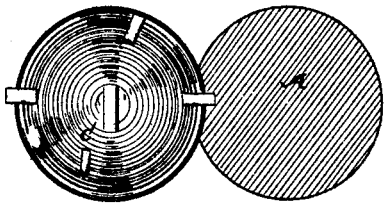
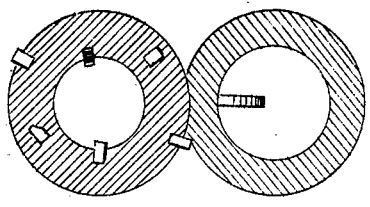
Witnesses.                    Inventor
                              G. F. Case

United States Patent Office.

G. F. CASE, OF WINDSOR, VERMONT, ASSIGNOR TO WINDSOR MANUFACTURING COMPANY, OF SAME PLACE.

Letters Patent No. 101,095, dated March 22, 1870.

IMPROVED DRILL-GUIDE.

The Schedule referred to in these Letters Patent and making part of the same.

*To all whom it may concern:*

Be it known that I, G. F. CASE, of Windsor, in the county of Windsor and in the State of Vermont, have invented certain new and useful Improvements in Drill-Guides; and do hereby declare that the following is a full, clear, and exact description thereof, reference being had to the accompanying drawings and to the letters of reference marked thereon, making a part of this specification.

The nature of my invention consists in the construction of an improved drill-guide for channeling rocks, marble, &c., by means of a series of holes cut communicating with each other.

The great difficulty in channeling rock, marble, &c., by means of intercommunicating holes is the liability of the drill, when passing along beside the hole previously drilled, to run into or diverge from it, so that when a channel of any considerable depth is made it will not be perfect at the bottom, but some portion of the channel will remain uncut.

The object of this improvement is to obviate this liability of the drill to deviate from its proper course, by using a guide attached to the drill, and operating in a hole previously drilled, and which will thus keep the drill on a line with such hole, and render the channel perfect the whole depth cut.

In order to enable others skilled in the art to which my invention appertains to make and use the same, I will now proceed to describe its construction and operation, referring to the annexed drawings, in which—

Figures 1 and 2 are side views of a drill-stock with guide attached;

Figures 3 and 4 are end views of the same;

Figures 5 and 6 are end views of the guide; and

Figures 7 and 8 show the channel to be cut.

B represents the drill-stock or rod, to the lower end of which the head C is firmly screwed.

The head C contains the cutting-points of diamonds or other suitable hard material.

A represents the collar or guide, an end view of which is shown in figs. 5 and 6, the round or body part of the guide being made the size of the hole bored.

In starting a channel, the first hole must be bored without the guide, after which the guide A is put on by unscrewing the drill-head and putting the guide on over the part of the head that screws into the drill-rod, thus securing it in place.

In fig. 2 I have represented a modification of the invention as applied to what is known as the annular diamond drill, the guide A being hollow so as to span over the core left in the hole by the drill, and is secured to the drill in the same manner as before described.

In fig. 8, $r\ r$ represent the cores as left in the channel, but these cores might be removed by a pawl or latch, arranged so as to catch into the core when the drill is withdrawn, and the core removed at the same time that the drill is withdrawn. One arrangement of such pawl and latch is shown in dotted lines in fig. 2.

The collar and guide need not necessarily be placed close to the drill-head, but may be placed any desired distance from the end of the drill, so that if the hole previously bored should be partially filled with sediment or cuttings from the hole being drilled, the guide would not reach that point and prevent the drill from giving the required depth.

This guide is applicable to all kinds of boring-machines or drills having a rotary motion, whether for rock or metals, where intercommunicating holes are to be drilled.

Having thus fully described my invention,

What I claim as new, and desire to secure by Letters Patent, is—

1. A guide for a rotary rock-drill, operating in a hole already drilled to guide the drill while it bores another hole, forming, with those already bored, a continuous channel, substantially as herein set forth.

2. In combination with the collar or guide, the pawl or "catch" for removing the core, when constructed substantially as specified.

In testimony that I claim the foregoing I have hereunto set my hand this 30th day of June, 1869.

G. F. CASE.

Witnesses:
L. W. HAWLEY,
M. C. BULLOCK.